UNITED STATES PATENT OFFICE.

EDGAR M. BOUTON, OF WILKINSBURG, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

1,406,255.  Specification of Letters Patent.  Patented Feb. 14, 1922.

Application filed October 3, 1917. Serial No. 194,431.

*To all whom it may concern:*

Be it known that I, EDGAR M. BOUTON, a citizen of the United States, and a resident of Wilkinsburg, in the county of Allegheny and State of Pennsylvania, have invented a new and useful Improvement in Motor-Control Systems, of which the following is a specification.

My invention relates to systems of control and particularly to systems of control for governing the pressure in fluid systems.

One object of my invention is to provide a control system of the above-indicated character that shall embody one or a plurality of blower motors which are controlled and operated in accordance with the pressure in a fluid system.

In many fluid systems and particularly in pneumatic tube systems which serve for dispatching packages from one station to another station, it is essential to have the fluid in a system maintained at substantially a uniform pressure and it is very desirable that the system be automatic in all its operations. Moreover, it is necessary that the amount of fluid supplied to the system be varied in accordance with the service required in order that the service which may be performed shall, in no way, be restricted between narrow limits.

In a system constructed in accordance with my invention, a plurality of motors are operated in any sequence and in any desired combination to maintain the pressure in a fluid system under varying service conditions. The system is automatic in all its operations and a single manually-operated switch is utilized for effecting the initial operation of the same and a second manually-operated switch is provided for stopping the operation of the system at any desired time.

More specifically, my invention embodies a plurality of main motors for severally operating blowers that serve for maintaining the pressure in a fluid system. A rheostat, that is associated with the motors, is provided with a number of independent resistor sections which are severally connected to the various motors, and a plurality of switches are provided for connecting the motors to the rheostat in any desired order, whereby the motors may be operated in a predetermined sequence. A pilot motor, the direction and the duration of rotation of which are controlled by the pressure in the fluid system, is provided for operating the rheostat to energize and control the speed of operation of a single motor and, in case of necessity, to operate any number of the blower motors.

Figure 1:
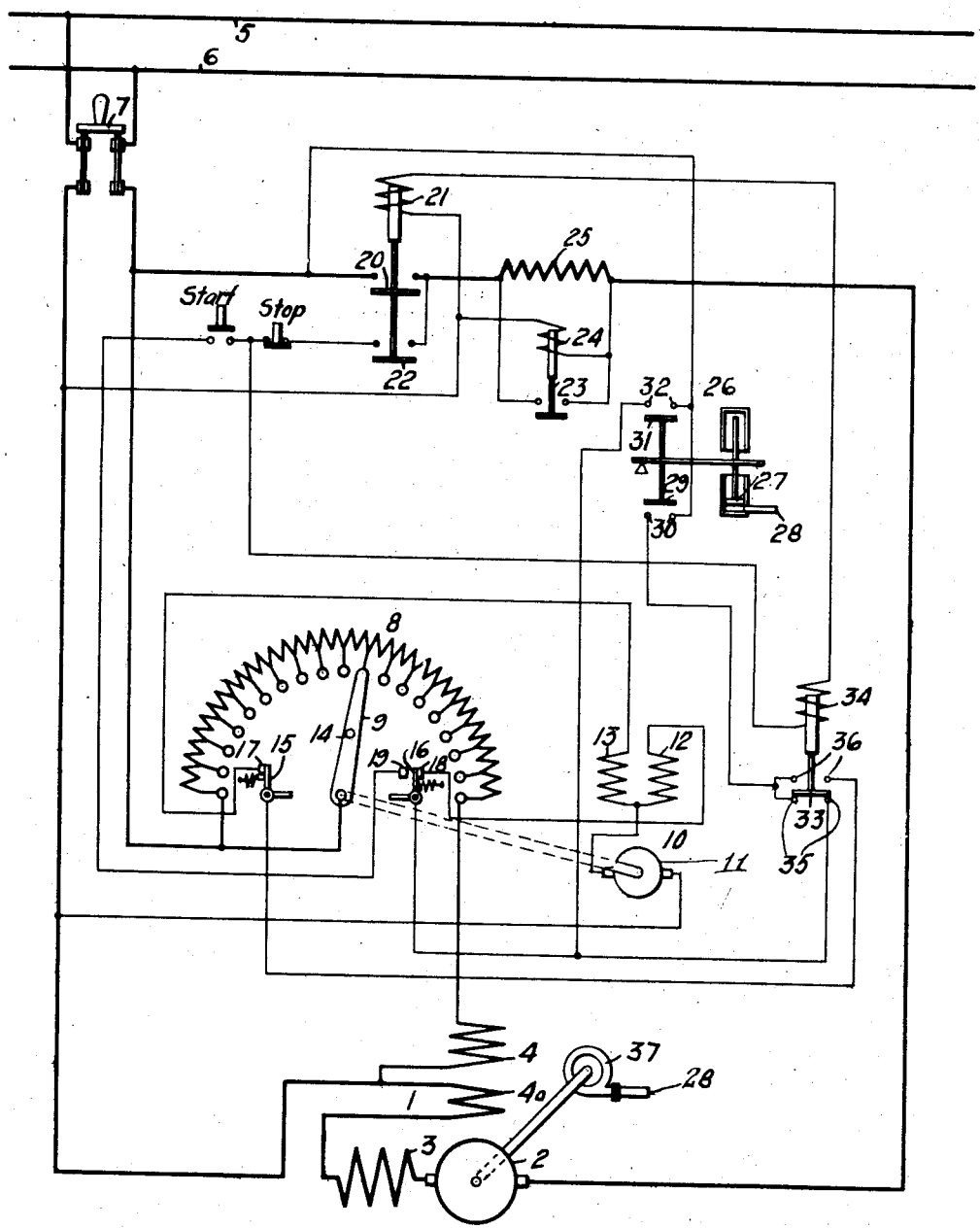
Figure 2:
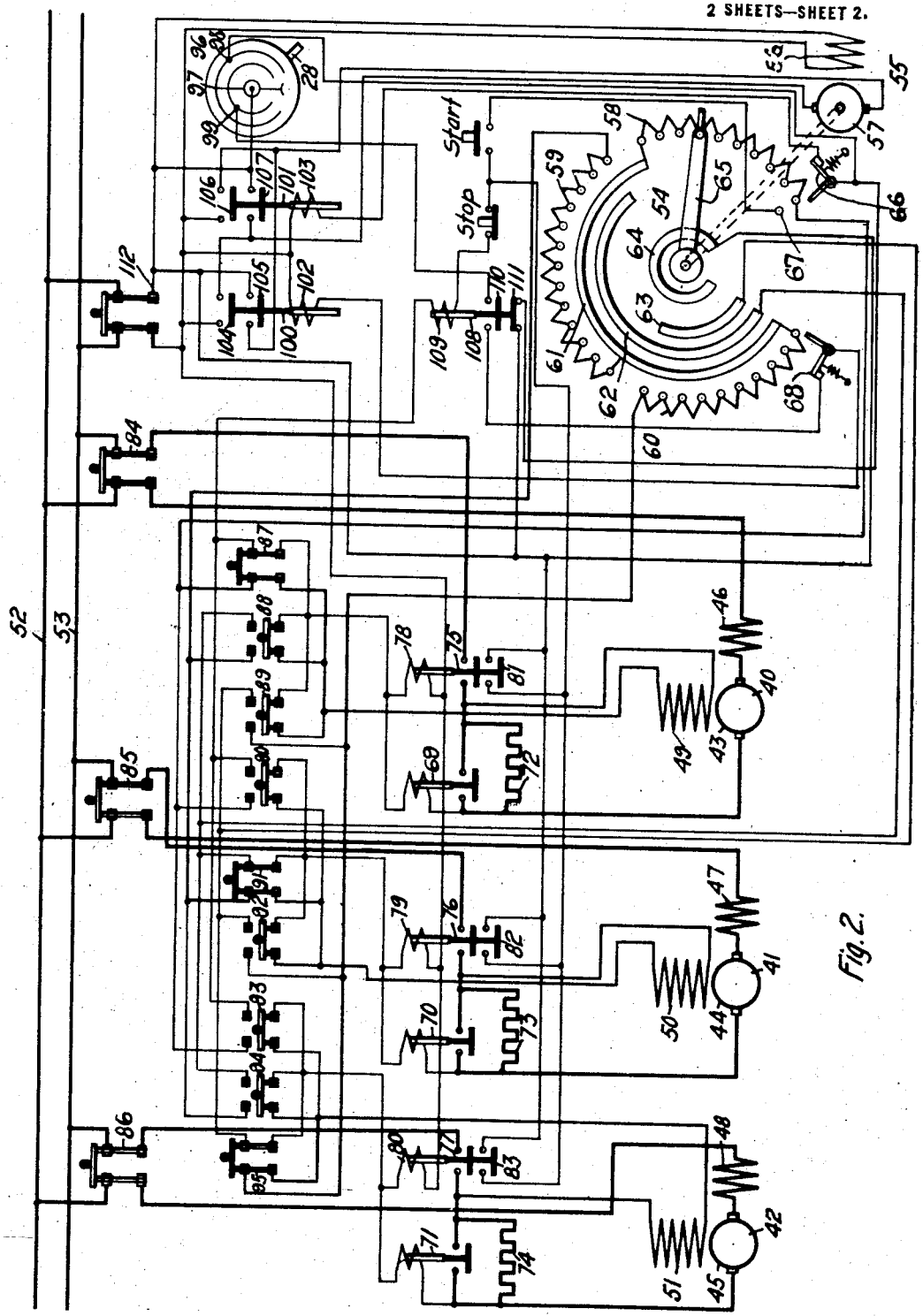

In the accompanying drawings, Fig. 1 is a diagrammatic view of control system provided with a single blower motor and constructed in accordance with my invention, and Fig. 2 is a diagrammatic view of a similar control system that is provided with a plurality of blower motors.

Referring to the system illustrated in Fig. 1 of the drawing, a blower motor 1, embodying an armature 2, a compensating field winding 3, a shunt field winding 4, and a series field winding 4ª, is adapted to be connected across a supply circuit, embodying the conductors 5 and 6, by means of a manually operated switch 7. A rheostat 8, having an operating arm 9, is provided for governing the energization of the shunt field winding 4 in order to control the speed of the blower motor 1. The arm 9 is operated in a forward and in a reverse direction by means of a pilot motor 10 that embodies an armature 11 and field windings 12 and 13. The arm 9 is provided with a pin 14 for operating trip switch members 15 and 16, and when in one extreme position, is adapted to open a circuit through a contact terminal 17 and, when in the other extreme position, is adapted to open the circuit through a contact terminal 18 and to close a circuit through a contact terminal 19. A line switch 20, having an operating coil 21 and an interlock switch 22, is provided for completing a circuit of the blower motor 1. An accelerating switch 23, having an operating coil 24, is adapted to short circuit a resistor 25, which is in circuit with the blower motor 1, when the blower motor is operating at a predetermined speed and has developed a predetermined armature reaction. Two manually-operated push-button switches, "Start" and "Stop," are provided for respectively performing the functions designated by their legends. A fluid-operated device 26, comprising a piston 27 which is controlled by the pressure in a fluid system 28, is adapted to operate a switch member 29 to bridge contact terminals 30 when the fluid pressure is reduced below a predetermined point and to operate a switch member 31 to bridge contact terminals 32 when the fluid pressure is raised above a predetermined point. A relay, having a switch member 33, and an operating coil 34, is adapted to bridge either contact terminals 35 or contact terminals 36, according to whether the relay is in an inoperative or in an operative position. The motor 1 is adapted to operate any suitable blower 37 for maintaining the pressure in the fluid system 28.

With the elements of the system in the positions indicated in the drawing, and assuming the motor to be stationary and the fluid pressure in the system 28 to be reduced to a point whereby the switch member 29 bridges the contact terminals 30, a circuit is completed from the positive line conductor 6 through the switch 7, contact terminals 30—that are bridged by the switch member 29—contact terminals 35—that are bridged by the switch member 33—trip switch member 16, contact terminal 18, field winding 12, armature 11 and the switch 7 to the negative supply conductor 5. The pilot motor 10 is energized and operates the rheostat arm 9 in a clockwise direction to its extreme right position, at which point the circuit of the pilot motor is broken by the trip switch member 16 which is disengaged from contact with the terminal 18 and engages contact terminal 19.

When the system is disposed as above set forth, the operation of the blower motor 1 may be initiated by the "start" push-button switch. When the "start" push-button switch is closed, a circuit is completed from the positive supply conductor 6 through switch 7, contact terminals 30—which are bridged by the switch member 29—contact terminals 35—which are bridged by the switch member 33—trip switch member 16, contact terminal 19, "start" push-button switch, coil 34, coil 21 and the switch 7 to the negative supply conductor 5. Thus, the line switch 20 is operated to complete a circuit through the blower motor 1, and the relay 33 is operated to complete a circuit through the pilot motor 10.

The circuit through the pilot motor 10 extends from the positive supply conductor 6 through the switch 7, contact terminals 30—which are bridged by the switch member 29—contact terminals 36—which are bridged by the switch member 33—trip switch member 15, contact terminal 17, field winding 13, armature 11 and the switch 7 to the negative supply conductor 5. The field windings 12 and 13 of the pilot motor 10 are wound in opposite directions in order that the direction of rotation of the pilot motor 10 may be controlled in accordance with which field winding is energized in combination with the armature 11. In the case under consideration, the pilot motor 10 is operated in a direction to move the rheostat arm 9 in a counter-clockwise direction from its extreme right-hand position toward the left, as shown in the drawing. The circuit, previously traced through the coils 21 and 34, the relay 33 and the trip switch member 16, is opened by the operation of the switch member 33, and the movement of the rheostat arm 9 from its extreme right-hand position. However, a holding circuit is completed by the interlock switch 22, associated with the line switch 20, for the coils 21 and 34. The holding circuit for the coils 21 and 34 may be traced from the positive supply conductor 6 through the switch 7, line switch 20, interlock switch 22, "stop" push-button switch, coil 34, coil 21 and the switch 7 to the negative supply conductor 5.

The circuit of the main blower motor 1 may be traced from the positive supply conductor 6 through the switch 7, line switch 20, resistor 25, armature 2, compensating field winding 3 and the switch 7 to the negative supply conductor 5. The circuit of the shunt field winding 4 is completed through the rheostat 8, and, as the rheostat arm 9 is rotated in a counter-clockwise direction, the resistance included in circuit with the shunt field winding 4 is increased to raise the speed of the blower motor 1.

When the pressure in the fluid system 28 is raised to a normal operating pressure, the fluid device 26 is operated to disconnect the switch member 29 from the contact terminals 30 and to open the circuit of pilot motor 10. Thus, the operation of the rheostat 8 to increase the speed of the motor 1 is interrupted and, unless the pressure is raised above, or lowered below, a predetermined point, so as to operate the fluid device 26, the motor 1 will operate at a constant speed.

In case the fluid pressure in the system 28 is raised somewhat above the normal operating pressure, the fluid device 26 is operated to bridge the contact terminals 32 by the switch member 31 and to close a circuit from the positive supply conductor 6 through the switch 7, contact terminals 32—which are bridged by the switch member 31—trip switch member 16, contact terminal 18, field winding 12, armature 11 and the switch 7 to the negative supply conductor 5. Thus, the pilot motor 10 is operated to move the rheostat arm 9 in a clockwise direction in order to decrease the resistance in circuit with the shunt field winding 4 and reduce the speed of the blower motor 1.

In case the rheostat arm 9 is operated in a counter-clockwise direction until the trip switch member 15 is engaged by the pin 14, then the circuit of the pilot motor 10 is broken by the trip switch member 15 becoming disengaged from the contact terminal 17. If it is desired to stop the operation of the blower motor 1, the "stop" push-button is operated to open the circuit of the coils 21 and 34 and release the line switch 20 and the relay 33, whereby the circuits of the blower motor 1 and of the pilot motor 10 are opened.

Referring to Fig. 2 of the drawings, a plurality of blower motors 40, 41 and 42, respectively, are provided with armature windings 43, 44 and 45, compensating field windings 46, 47 and 48, and shunt field windings 49, 50 and 51. The motors are adapted to be connected across a supply circuit embodying conductors 52 and 53 and to be controlled by a rheostat 54 and a pilot motor 55.

The pilot motor 55 embodies a field winding 56 and an armature 57. The rheostat 54 embodies three resistor sections 58, 59 and 60, which are inserted in circuit with the shunt field windings 49 to 51, inclusive, in any desired order, and a plurality of contact segments 61, 62, 63 and 64 which are selectively engaged by the rheostat arm 65 for governing the operation of the motors 40, 41 and 42. A trip switch 66 is opened and a contact terminal 67 is engaged by the arm 65 when the same is given a movement of rotation in a clockwise direction to its extreme position, and a trip switch 68 is opened by the rheostat arm 65 when the same is given a movement of rotation in a counter-clockwise direction to its extreme position.

Three switches, 69, 70 and 71, having their coils connected across the motors 40, 41 and 42, are provided for short-circuiting the resistors 72, 73 and 74 in the circuits of the motors. When the armature reaction of any motor is increased to a predetermined point, the switch associated therewith is operated in order to short circuit the resistor and accelerate the motor. Line switches 75, 76 and 77, respectively having energizing coils 78, 79 and 80, and interlock switches 81, 82 and 83, are provided for closing the circuit of the motors 40, 41 and 42 through the hand-operated switches 84, 85 and 86 across the supply conductors 52 and 53.

A plurality of sequence switches 87 to 95, inclusive, are provided for determining the sequence of operation of the motors 40, 41 and 42. A fluid device 96, having a Bourdon tube connected to a fluid system, is adapted to operate a contact arm 97 to engage contact terminals 98 and 99, according to the pressure in the fluid system associated with the Bourdon tube. Two relays 100 and 101, having energizing coils 102 and 103, are provided for controlling the operation of the pilot motor 55. The relay 100 is provided with switch members 104 and 105 and the relay 101 is provided with switch members 106 and 107. Two push-button switches respectively designated by the legends "Start" and "Stop", and a relay 108, having an energizing coil 109 and switch members 110 and 111, are provided for governing the operation of the rheostat 54 by means of the pilot motor 55. A manually-operated switch 112 is provided for initiating the operation of the system when the same has been stopped and the rheostat arm is located at any intermediate point between its two extreme positions.

The switches 87 to 95, inclusive, determine the sequence of operation of the motors 40, 41 and 42, and, with the switches 87, 91 and 95 closed, as illustrated in the drawing, the motor 40 will be operated first and the motor 41 second, and the motor 42 last. By selecting any combination of the switches 87 to 95, the sequence of operation of the motors 40 to 42, inclusive, may be varied as desired. It is believed that the manner in which the sequence of operation of the motors 40, 41 and 42 is determined by the switches 87 to 95, inclusive, will be apparent from the description of the operation of the motors when the switches 87, 91 and 95 are closed.

Assuming the system to be in the position shown, with the rheostat arm 65 in any position except that in which it engages the contact terminal 67, a circuit is completed from the positive supply conductor 53 through the switch 112, coil 103 of the relay 101, trip switch 66, switch 111, and switch 112, to the negative supply conductor 52. The relay 101 is operated to complete a circuit from the positive supply conductor 53 through switch 112, switch member 106, armature 57 of the pilot motor 55, contact member 107 and the switch 112 to the negative supply conductor 52. Inasmuch as the field winding 56 of the pilot motor is connected directly across the supply conductors 52 and 53 by means of the hand-operated switch 112, the pilot motor is operated to move the rheostat arm 65 in a clockwise direction to engage the contact terminal 67 and open the trip switch 66. The opening of the trip switch 66 de-energizes the coil 103 of the relay 101 which, in turn, opens the circuit of the pilot motor 55.

With the system in the position above set forth, the operation of the system may be initiated by means of the "start" push-button switch. It will be noted that it is impossible to effect the initiation of the operation of the system by the "start" push-button switch until the rheostat arm 65 has been returned to initial position, as above set forth.

When the "start" button switch is operated, a circuit is completed from the positive supply conductor 53 through the switch 112, coil 78 of the line switch 75, switch 87, coil 109 of the relay 108, "stop" button switch, "start" button switch, contact terminal 67, rheostat arm 65, contact segment 64, and switch 112 to the negative supply conductor 52. The relay 108 operates contact member 110 to complete a circuit from the positive supply conductor 53 (assuming the pressure in the fluid system to be reduced to such value that the contact arm 97 engages the contact terminal 99) through the switch 112, coil 102 of the relay 100, trip switch 68, switch member 110, contact terminal 99, contact arm 97 and the switch 112 to the negative supply conductor 52. The relay 100 is operated to complete a circuit from the positive supply conductor 53 through the switch 112, switch member 104, armature 57 of the pilot motor 55, switch member 105 and the switch 112 to the negative supply conductor 52. Thus, the pilot motor 55 is operated to move the rheostat arm 65 in a counter-clockwise direction.

The switch 75, when operated, completes a circuit from the positive supply conductor 53 through the switch 84, switch 75, resistor 72, armature 43, compensating field winding 46 and the switch 84 to the negative supply conductor 52. The interlock switch 81, which is associated with the line switch 75, serves to maintain a holding circuit through the coil 78 of the line switch 75 and the coil 109 of the relay 108. The holding circuit may be traced from the positive supply conductor 53 through the switch 112, coil 78, switch 87, coil 109, "stop" button switch, interlock switch 81, and the switch 112 to the negative supply conductor 52.

The shunt field winding 49, when the sequence switches are connected as shown in the drawing, is connected in series with the resistor section 58 of the rheostat 54. The circuit of the shunt field winding 49 may be traced from the positive supply conductor 53 through the switch 84, switch 75, field winding 49, switch 87, resistor section 58, rheostat arm 65, contact segment 64 and the switch 112 to the negative supply conductor 52.

In case the pressure in the fluid system is raised to such point that the contact arm 97 is disengaged from the contact terminal 99, then the circuit for the energizing coil 102 of the relay 100 is opened and the relay 100 is released to stop the operation of the pilot motor 55 and the movement of the rheostat arm 65.

In case the pressure in the fluid system is raised above a predetermined normal value, the contact arm 97 engages the contact terminal 98 to complete a circuit from the positive supply conductor 53 through the switch 112, coil 103 of the relay 101, trip switch 66, contact terminal 98, contact arm 97 and the switch 112 to the negative supply conductor 52. Thus, the relay 101 is operated to complete a circuit through the pilot motor 55 whereby the latter operates the rheostat arm 65 in a clockwise direction in order to reduce the resistance included in circuit with the shunt field winding 49 and lower the speed of the motor 40.

If the blower motor 40 is of insufficient capacity to maintain the pressure in the fluid system, the contact arm 97 engages the contact terminal 99 and operates the pilot motor 55 to move the rheostat arm 65 in a counter-clockwise direction until the resistor section 58 is included in circuit with the shunt field winding 49, and the rheostat arm engages the contact segments 61 and 62. The contact segment 61 serves to complete a circuit through the field winding 49 and the resistor section 58, and the contact segment 62 serves to complete a circuit for operating the line switch 76 of the motor 41. The circuit through the coil 79 of the line switch 76 may be traced from the positive supply conductor 53 through the switch 112, coil 79, switch 91, contact segment 62, rheostat arm 65, contact segment 64 and switch 112 to the negative supply conductor 52. The line switch 76 is operated to complete a circuit from the positive supply conductor 53 through the switch 85, line switch 76, resistor 73, armature 44, compensating field winding 47 and switch 85 to the negative supply conductor 52. The blower motor 41 is thus operated to assist the blower motor 40 in maintaining full pressure in the fluid system.

The resistor section 59 is connected in series with the shunt field winding 50 of the blower motor 41 and, while the pilot motor 55 is operated to move the rheostat arm 65 in a counter-clockwise direction, the resistor section 59 is gradually introduced into the circuit of the shunt field winding 50 to increase the speed of the motor 41. The circuit of the field winding 50 may be traced from the positive supply conductor 53 through the switch 85, line switch 76, field winding 50, switch 91, resistor section 59, rheostat arm 65, contact segment 64, and the switch 112 to the negative supply conductor 52.

In case the two motors 40 and 41 have a capacity insufficient for maintaining the fluid pressure in the fluid system at a predetermined normal pressure, the rheostat arm 65 is advanced in a counter-clockwise direction by the pilot motor 55 to engage the contact segment 63. Thus, a circuit is completed from the positive supply conductor 53 through the switch 112, coil 80 of the line switch 77, switch 95, contact segment 63, rheostat arm 65, contact segment 64 and the switch 112 to the negative supply conductor 52.

The line switch 77 is operated and a circuit is completed from the positive supply conductor 53 through the switch 86, line switch 77, resistor 74, armature 45, compensating field winding 48 and the switch 86 to the negative supply conductor 52. A circuit is completed through the shunt field winding 51 of the motor 42 from the positive supply conductor 53 through the switch 86, line switch 77, field winding 51, switch 95, resistor section 60, rheostat arm 65, contact segment 64 and the switch 112 to the negative supply conductor 52. The three motors 40, 41 and 42 are thus simultaneously operated to maintain pressure in the fluid system.

When the rheostat arm 65 is connected to the resistor section 59 or the resistor section 60, the pilot motor 55 may be controlled in a forward or in a reverse direction by means of the fluid device 96 and the relays 100 and 101 to vary the excitation of the shunt field windings 50 and 51 and accordingly to vary the speed of the motors 41 and 42.

In case the rheostat arm 65 is operated in a counter clockwise direction to include all the resistor section 60 in circuit with the shunt field winding 51 of the motor 42, the trip switch 68 is operated to break the circuit of the coil 102 of the relay 100 and prevent further operation of the pilot motor 55 and the rheostat arm 65.

It will be noted that, if the motors 40, 41 and 42 are operated in any other sequence than that which has been described, the interlock switches 82 and 83, which are associated with the line switches 76 and 77, operate in a manner similar to the operation of the interlock switch 81 for establishing a holding circuit through the coil 109 of the relay 108 and the coils of the line switches which may be operated. In case it is desired to stop the operation of the motors at any time, the "stop" push-button is operated to open the circuit of the coil 109 and the coils of the operated line switches. A similar effect is obtained after a failure of voltage. The rheostat arm 65 is then returned to its initial position, as above described, by the completion of the circuit controlled by the switch member 111.

Although I have described my system in connection with three motors, it is evident that, if so desired, any number of motors may be connected and operated in a similar manner and in any desired sequence.

Modifications in the system and arrangement and location of parts may be made within the spirit and scope of my invention and such modifications are intended to be covered by the appended claims.

I claim as my invention:

1. In a system of control for a fluid system, the combination with means comprising a motor for supplying fluid pressure to the fluid system and means comprising a rheostat for controlling the speed of said fluid-supplying means, of means for governing said controlling means in accordance with the value of the fluid pressure in said fluid system, said governing means serving to render said controlling means temporarily further inoperative upon said fluid pressure becoming of normal value and to maintain the speed of said motor constant so long as the value of said fluid pressure remains normal.

2. In a system of control for a fluid system the combination with means comprising a motor for supplying fluid pressure to the fluid system and means comprising a rheostat for controlling the speed of said fluid-supplying means, of means for governing said controlling means in accordance with the value of the fluid pressure in said fluid system, said governing means serving to render said controlling means temporarily further inoperative upon said fluid pressure becoming of normal valve and to maintain the speed of said motor constant so long as the value of said fluid pressure remains normal, said governing means also serving to render said controlling means effective to increase or decrease the speed of said motor in accordance with the value of the fluid pressure in said fluid system.

3. In a system of control for a fluid system, the combination with a main motor having a shunt field winding, a rheostat for varying the excitation of the shunt winding, and an auxiliary motor for operating the rheostat to vary the excitation of the shunt winding, of means comprising switches and circuit connections for varying the operation of said auxiliary motor in a forward and in a reverse direction in accordance with the pressure in the fluid system.

4. In a system of control for a fluid system, the combination with a main motor having an armature and a field winding, a rheostat for varying the excitation of said field winding, and a pilot motor for operating said rheostat, of means, comprising a fluid-operated switch and circuit connections associated therewith, for varying the direction of rotation of said pilot motor to control the speed of the main motor in accordance with the pressure in the fluid system.

5. In a system of control for a fluid system, the combination with a plurality of main motors, a rheostat for governing the operation of said motors and a pilot motor for operating said rheostat, of means, comprising switches and circuit connections, for varying the direction of rotation of the pilot motor in accordance with the pressure in the fluid system.

6. In a system of control for a fluid system, a plurality of motors and means comprising a rheostat and switches and circuit connections associated therewith for operating said motors in a selected sequence that occurs in accordance wth the pressure in the fluid system.

7. In a system of control for a fluid system, the combination with a plurality of motors, of means for effecting a selected sequence of operation of said motors that occurs in accordance with the pressure in the fluid system.

8. In a system of control for a fluid system, the combination with a plurality of main motors, and a rheostat for controlling the sequence of operation and the speed of said motors, of a pilot motor for operating said rheostat and means for selectively operating said pilot motor.

9. In a system of control for a fluid system, the combination with a plurality of main motors, a rheostat for selectively governing the operation of said motors, and a pilot motor for operating the rheostat, of a fluid switch and switches and circuit connections associated therewith for operating the pilot motor in a forward and in a reverse direction.

10. In a system of control for a fluid system, the combination with a plurality of main motors having armature and field windings, and a rheostat having a plurality of independent resistor sections that are severally inserted in circuit with said field windings, said rheostat embodying means for selectively operating the various motors, of a pilot motor for operating the rheostat to selectively operate the main motors and to increase or decrease the speed of any separate motor, and means for selectively operating the pilot motor.

11. In a system of control, the combination with a plurality of main motors, a rheostat having a plurality of independent resistor sections, and means for connecting the motors to the resistor to be operated in any desired sequence, of a pilot motor for operating the rheostat, and means for selectively operating the pilot motor in a forward and in a reverse direction.

12. In a system of control, the combination with a plurality of main motors, a rheostat provided with means for operating the motors in a predetermined order and for governing the speed of the motors, and a pilot motor for operating the rheostat, of means the operation of which is initiated by a manual switch for effecting the operation of the pilot motor in a forward and in a reverse direction, and means, comprising a single switch, for breaking all circuits in the system.

13. In a system of control, a plurality of main motors and means, comprising a rheostat, a pilot motor and switches and circuit connections associated therewith, for operating the motors in a predetermined order and for varying the speed of the various motors in accordance with the pressure in the fluid system.

14. In a system of control for a fluid system, a plurality of motors, means, comprising a rheostat having an initial position and a second position, and switch and circuit connections associated with said rheostat, for operating said motors in accordance with the pressure in the fluid system, a push-button switch, and means for preventing the initiation of the operation of the system by the push-button switch when the rheostat is not in the initial position.

15. In a system of control for a fluid system, the combination with a plurality of motors, of means for so connecting said motors as to be operated in any desired sequence, which occurs in accordance with the pressure in the fluid system.

16. The combination with a pair of motors, of a pair of switches for each of said motors for controlling the sequence of operation of said motors, each of said motors being adapted for initial operation when one of its pair of switches is closed and for subsequent operation when the other of its pair of switches is closed.

17. The combination with a pair of motors each having an armature and a field-magnet winding, a resistor adapted to be connected in circuit with the field-magnet winding, and a switch for closing the motor circuit, of a pair of switches for each of said motors, and each adapted to connect the resistor in circuit with the field-magnet winding and to control the motor-circuit-closing switch, and means whereby one of each of said pair of switches is rendered ineffective to control its motor-circuit-closing switch until after the other motor-circuit-closing switch is closed.

In testimony whereof, I have hereunto subscribed my name this 14th day of Sept., 1917.

EDGAR M. BOUTON.